United States Patent
De Araújo Miyagawa et al.

(10) Patent No.: US 11,093,117 B2
(45) Date of Patent: Aug. 17, 2021

(54) METHOD FOR CONTROLLING ANIMATION'S PROCESS RUNNING ON ELECTRONIC DEVICES

(71) Applicant: SAMSUNG ELETRÔNICA DA AMAZÔNIA LTDA., São Paulo (BR)

(72) Inventors: Taynah De Araújo Miyagawa, Manaus (BR); Alvaro Augusto Braga Lourenço, Manaus (BR); Adriano Mendes Gil, Manaus (BR)

(73) Assignee: SAMSUNG ELETRÔNICA DA AMAZÔNIA LTDA., São Paulo (BR)

( * ) Notice: Subject to any disclaimer, the term of this patent is extended or adjusted under 35 U.S.C. 154(b) by 180 days.

(21) Appl. No.: 16/376,591

(22) Filed: Apr. 5, 2019

(65) Prior Publication Data

US 2020/0057540 A1    Feb. 20, 2020

(30) Foreign Application Priority Data

Aug. 20, 2018    (BR) ...................... 10 2018 017046 5

(51) Int. Cl.
*G06F 3/0484* (2013.01)
*G06T 13/80* (2011.01)
*G06F 3/01* (2006.01)
*G06F 3/0488* (2013.01)

(52) U.S. Cl.
CPC ............ *G06F 3/0484* (2013.01); *G06F 3/017* (2013.01); *G06F 3/04883* (2013.01); *G06T 13/80* (2013.01)

(58) Field of Classification Search
CPC ......... G06T 13/40; G06T 13/00; G06T 13/80; G06T 13/20; A63F 13/10; A63F 2300/6607
See application file for complete search history.

(56) References Cited

U.S. PATENT DOCUMENTS

| | | | |
|---|---|---|---|
| 5,495,566 | A | 2/1996 | Kwatinetz |
| 8,624,925 | B2 | 1/2014 | Wilson et al. |
| 9,003,332 | B2 | 4/2015 | Mattos et al. |
| 2012/0062604 | A1 | 3/2012 | Lobo et al. |
| 2012/0272181 | A1 | 10/2012 | Rogers et al. |

*Primary Examiner* — Todd Buttram (57) ABSTRACT

Method for controlling animation's process running on electronic devices having a processor adapted to execute instructions stored in a memory, the method including: interpreting an input method to generate an initial velocity; executing a routine projection using the initial velocity and a current GUI position to generate a factor; executing an adaptive routine using the factor to calculate a new modulated position/velocity value; executing a physics model iteration using the modulated position/velocity value to generate an updated position/velocity value; updating the graphical user interface with the updated position/velocity value and executing the control methods from the new set of position/velocity values, in which the control methods are a progressive forecasting method or an accurate modulation method.

10 Claims, 5 Drawing Sheets

METHOD FOR CONTROLLING ANIMATION'S PROCESS RUNNING ON ELECTRONIC DEVICES

CROSS-REFERENCE TO RELATED APPLICATIONS

This application claims the foreign priority benefit of Brazilian Patent Application No. 10 2018 017046 5, filed on Aug. 20, 2018 in the Brazilian Intellectual Property Office, the disclosure of which is incorporated herein by reference.

FIELD OF INVENTION

The present invention relates to a control method for animated Graphical User Interface (GUI) feedbacks in implementations with varying (Progressive Forecasting) or absolute precision (Accurate Modulation).

BACKGROUND OF INVENTION

Mainstream Virtual Reality (VR) systems consist of digital experiences that expose to each human eye images that are placed inside an artificial 3D environment. As the main agent of the declared illusion of presence, this visual stereoscopy is commonly complemented by sound and tactile outputs in order to achieve broader sensory immersion. Augmented Reality (AR) synchronizes virtual and real worlds in order to overlay computer generated content across user's environment in an additive manner, so that user may see both virtual and augmented realities together. While the main distinction between virtual reality and augmented reality is respectively one of replacing versus enhancing reality with 3D digital content, mixed reality (MR) combines these approaches together in order to generate a completely artificial environment that considers the real-world contours.

VR, AR and MR are all pieces of emerging technologies assembled under recent discussions and developments around Virtual Environments (VEs), a topic which became mainstream after Oculus Rift's crowdsourced prototype in 2012, following its later acquisition by Facebook. Since then, VR devices have been intensely marketed by multiple brands, reaching millions of unit sales as of 2017—before all this, virtual reality was just unreachably expensive for consumer grade access.

After two years of intense market collaboration to identify, test and distribute new interactivity patterns for virtual environments, this is still an ongoing endeavor for companies like game studios, research labs and big enterprises to accomplish. Thus far, this challenge included not only the new craftsmanship required to build interactive 3D environments, but also the design heuristics to transpose and sustain legacy 2D Graphical User Interface (GUI) interactivity within the virtual space.

In the perspective of information design, recent developments of desktops, smartphones, televisions and watches point that simplicity and low-density presentations are more prone to deliver a balanced flow of information and interaction. Labeled as 'Flat Design' (FD), and based on modernist design schools of the nineties and twenties, this trend sustains that "form follows function", and makes bold use of font sizes, white spaces and poster images to communicate objective and subjective values—most of interfaces nowadays refer to that flat axiom, which is widely experimented across the software industry.

However, in an attempt to comply with these FD principles, virtual environments need to first work around its particular problem of display resolution. Virtual displays are bound to live closer to user eye, independently of its mobility level. Aside of this, the human eye operates with angular field of view limitations that restrict readable screen space, often slashing the drawable canvas down to a quarter. It means that in order to provide a detailed resolution, one Virtual Environment display must have higher density of pixels per inch (PPI) than flagship 2D screens. All this happens because variables such as display distance and pixel density have a negative correlation—the closer a display is from the eye (less distance), the denser a display must be (more pixels) to sustain a same quality standard of display resolution. Then, in essence, it is possible to transpose FD frameworks into virtual environments, but there will be a severe tradeoff between display size and resolution.

One person can easily overstate 360 Virtual Environment media by thinking it offers wider canvas to design, for instance. When in fact it does, this wider canvas will have narrower focusable areas for the interface, much lower resolution quality, and higher resource consumption. This is an especially delicate issue for ongoing research fields such as augmented reality, which faces several hardware limitations in order to associate the design of lower weight glasses with wider and crisper displays. When considering current standards of readability and familiarity, most of the current Virtual Environment devices offer the minimum balance of screen space and resolution, generally down to less than a half of what standard flagships can do.

With a smaller display canvas and resolution, current design methods are forced to rework the balance of information and interaction to provide a rational and enjoyable experience. This can be accomplished by reducing the information of the screens and/or applying other GUI methods (e.g. menus, scroll panels and page flips) to organize and control information volumes. Historically, these control methods introduced essential features and gestures that leveraged smaller mobile screens over desktops computers, since the iPhone in 2007. Methods like scrolling by throwing panels with finger swipes became a common resource of many applications now serving billions of users.

In view of the aforementioned concerns, the present invention introduces a new set of control methods for GUI animation feedbacks that works on subtle nuances to optimize visualization and controls for smaller sized viewports. It allows for GUI feedbacks acting in observance to foreseeable display restriction of virtual environments, while maximizing familiarity with current user experience. These methods will also enhance the forwarding of many mobile gestures and methods to virtual environments while preserving core privileges of the optimal display visualization, content control and reading experience for virtual reality, augmented reality and mixed reality technologies.

In the current state of the art, the following technologies can be found allowing the implementation (technical viability) of the disclosed subject-matter:

1. Input device is defined as any device that enters information into a computer from an external source (e.g. keyboards, touchscreens, mouse, microphones, scanners). An input device sends data to another device, which commonly is a central processor unit (CPU).

2. In the other side of the input-process-output (IPO) is the Graphical User Interface (GUI). Almost all of digital interfaces nowadays are GUIs. An interface is a set of data, commands/controls and/or menus/navigation displayed on a screen, through which a user communicates with a program—in other words, GUI is the part of a system through which the user will interact. The first commercially available GUI was released in 1981 and since then it has been evolved to adjust to new technologies and types of digital devices available in the market.

3. Head-mounted display (HMD) is a device used over the head including a display in front of one or both user's eyes. This display streams data, images and other types of information. Basically, HMD is a content-viewing hardware. Initially created for the aviation industry, the HMD is used as the main hardware in the VR/AR industry.

Most of the current HMDs using the IPO model provide a multi-purpose controller that mixes the ergonomics of TV remotes, the functionality of joystick buttons and the gesture-based interactions of touchpads. These input devices are used to control Virtual Environment scenarios and GUIs.

Some types of HMD include: Slide-on HMD (mobile-based, uses smartphone as display, for processing and tracking), Tethered HMD (PC-based, provides everything aside from processing, which is done by the PC) and Integrated HMD (totally independent device, containing everything for delivering an immersive experience).

Following, some solutions are discloses having similarities with the present invention but that are technically different or present different objectives/purposes.

The patent application US 2012/0062604 A1 titled "FLEXIBLE TOUCH-BASED SCROLLING", by Lobo Philomena et al., filed on Sep. 15, 2010, proposes methods to identify whether gesture velocity on a touchscreen is below or above a certain threshold, responding with a smooth scroll if speed is low and a page flip when the speed is high enough. This solution differs from the present invention by nature: it focuses on defining two gesture-based use cases that scroll interface contents, however it does not specify how those resulting feedbacks should animate similar to the method of the present invention, neither provides or uses the controls used in the present invention.

The patent application US 2012/0272181 A1 titled "METHOD AND APPARATUS FOR INTUITIVE WRAPPING OF LISTS IN A USER INTERFACE", by ROGERS SEAN S. et al, filed on Apr. 22, 2011, defines thresholds limits for scrolling after a list's top and bottom boundaries, so when the touch gesture reaches those boundaries it gives the feedback of cycling towards the list's opposite end, which then animates again to fit in the opposite side of the screen. This is different from the method of the present invention as it works to define a single specific use case and gesture whereas the method of the present invention focuses on specifying new alternatives to control animations on GUIs while providing the extra layer of viewport control to enhance visibility, readability, and the overall user experience.

The U.S. Pat. No. 9,003,332 B2 titled "PREDICTIVE SCROLLING", by MELLMO INC, granted on Jun. 5, 2014, calculates the end position of scroll animations with anticipation, then it pulls off database records to populate GUI before the scroll animation ends an effort to guarantee faster system response and visualization times. As the claims for this patent are oriented to the task of managing database records, it departs from the proposed scope of the present invention, which focuses on new animation control methods to provide varying levels of accuracy for conforming GUI into viewport spaces in a subtle yet familiar manner (one that is back compliant with the acknowledged methods and gestures currently running the mobile industry).

The U.S. Pat. No. 8,624,925 B2 titled "CONTENT BOUNDARY SIGNALING TECHNIQUES", by QUAL-COMM INCORPORATED, filed on Oct. 16, 2009, relates to methods and devices providing a user interface that provides visual cues when a document pan or scroll has reached an end or boundary by distorting the document image in response to further user inputs. The speed of user gestures over the screen are used to calculate final positions for the list. When this position becomes out of the list, a boundary effect is applied to inform the user. Such calculation does not consider controlling the animation in the manner that the method of the present invention proposes to. The method of the present invention ensures [1] final arbitrary states/positions while [2] preserving the appearance of the physics-model animation of choice along the animation's execution. In simpler words, the present invention controls the animations, while their method is just triggering effects when an "off-limit" position is calculated. It should be considered that the nature of the method of the present invention—they control the animation during its performance, offering flexible and varying levels of accuracy to serve many intended effects. Although expressing this flexibility, Progressive Forecasting and Accurate Modulation are not sufficient to fulfill the results of the present invention alone: the Projection and the Adaptive routines are central in this regard, as they are used to continuously modulate the speed and positions while animation is happening, so they can converge to static arbitrary state without breaking with the chosen physics-model animation, nor with the users expectations regarding what should follow their gesture.

The U.S. Pat. No. 5,495,566 A titled "SCROLLING CONTENTS OF A WINDOW", by Microsoft Corp., filed on Nov. 22, 1994, provides three aspects for scrolling beyond boundaries with variable speeds. The first calculates different speeds according with the mouse cursor acceleration; second one defines that the variable speed should be inversely proportional to the number of times that scrolling has been triggered; and finally, the third aspect examines the amount of times a key input has been triggered to perform a scroll, so when this range is not reached within a certain time it provides a simple scroll animation as output, but when it is reached it performs a jump scroll instead. Although using different input methods as the method of the present invention does, this prior art methods focus on the task of scrolling beyond boundaries. This is different from the agnostic purpose of our control methods, which focuses on controlling feedback animations of any kind, instead of dealing with specific exception cases for boundary scrolls.

SUMMARY OF INVENTION

In face of the challenges faced in Virtual Environments—especially on dealing with limited displays while using proven design frameworks and migrating familiar gestures/controls from the already matured mobile computing field—the method of the present invention focuses on the creation of an additional layer of controls for GUI animations.

When applied, the method of the present invention offers the opportunity of enhanced coordination of GUI elements while being manipulated by users. It ensures optimal visual performance of the interface canvas without breaking with the expected feedbacks, nor requiring secondary tasks and methods to fix composition problems.

The proposed control method for GUI animations is based on a single software architecture with two optional behaviors to support multiple types of implementations: Progressive Forecasting and Accurate Modulation. These methods can be used with several input types, being compliant with many of the existing devices (e.g. remote controls, touchpads, screens) while also operating effectively with many of the modern animation standards.

Progressive Forecasting and Accurate Modulation refer to the wide spectrum of possible method implementations, using inverse models with varying precision to anticipate the final position of animations before they are completed. The first runs along the animation loop, getting more precise as the animation happens; and the latter runs only once at the beginning of the animation, due to its highly accurate model.

Furthermore, the architecture consists of a pair of co-dependent routines that cycle through output methods—like Physics-based animation loops—to ensure that the final positions will be reached by the end of the animations, without changing the expected user feedbacks and affordance requirements.

The present invention overcomes the drawbacks of the prior art by solving frequent design problems (related to viewport management) encountered on virtual reality, augmented reality and mixed reality developments, while implementing a decoupled architecture that can be used on several GUI-related situations. By using this method, an application can deliver improved controls for user manipulated compositions.

The proposed animation control method improves the performance of fundamental gestures that virtual environments and other small screens inherit from mobile computing by enhancing the effectiveness and accuracy during pan gestures. This method is able to rebalance the natural inability of smaller screens to provide comfortable content presentation and good reading experience, by eliminating the need for manual intervention of user and/or secondary method implementations to correct bad GUI areas and poor alignment of elements.

The increased performance and familiarity of the proposed output method benefit overall user experience and value perceived for the many applications that make use of interfaces (especially in virtual environments), adding an extra control layer that works to preserve content visualization without interruption of the expected interface behaviors.

Furthermore, the solution is completely decoupled from input methods, preserving them for integrations with other subsystems and works across a wide range of industry hardware from peripherals to high end devices with minimum requirements.

BRIEF DESCRIPTION OF DRAWINGS

The objectives and advantages of the present invention will become clearer through the following detailed description of the non-limitative pictures presented at the end of this document.

DETAILED DESCRIPTION OF INVENTION

Overview

As explained above, the present invention introduces a new set of animation control methods that provide improved controls for Graphical User Interfaces (GUI) on Virtual Environments (VEs). It works in fine nuances to improve user control over the information design without however being noticeable or adding secondary methods to fix contents in the display. By using these animations, developers can transport legacy mobile methods for controlling 2D screens into virtual environments with minimal impacts on both user and system efficiencies, while keeping the familiarity of mobile behaviors in the 3D environment.

In the forthcoming description, it will become clearer why the context of virtual environments lacks these special methods, and how they can be embedded/applied/used on a plurality of experiences.

Figure 1:
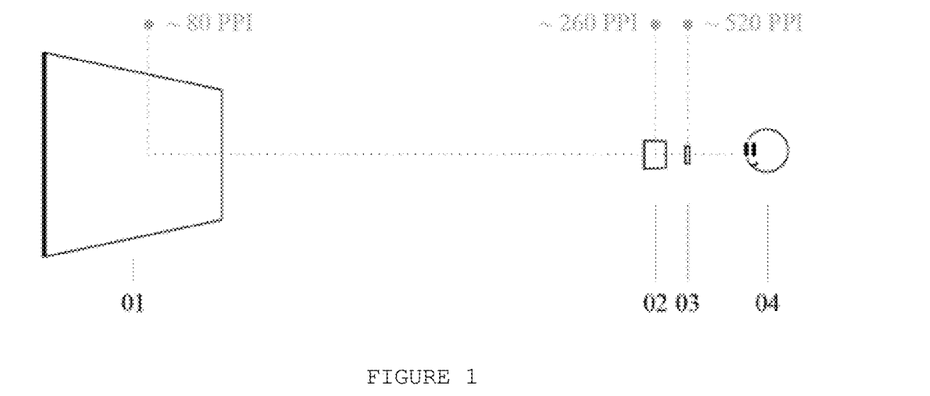
FIG. 1 shows the negative correlation between PPI and screen distance.

Pixel per inch (PPI), a common measure for screen quality in the modern electronics industry, is essential on understanding some challenges currently affecting productions on virtual environments. Putting it simply, PPI is a quality measure that should be increased according to how close one screen is to the observer. This is an acceptable configuration due to the limited eye capabilities of capturing image details as the object of observation is placed farther away—given one fixed distance, users tend to see pixelated and less detailed images if PPI is not high enough to support the quality standard. FIG. 1 discloses some of the latest displaying devices such as television (01), tablet (02) and smartphone (03) illustrating how PPI increases as distance to eye shortens (04).

Figure 2:
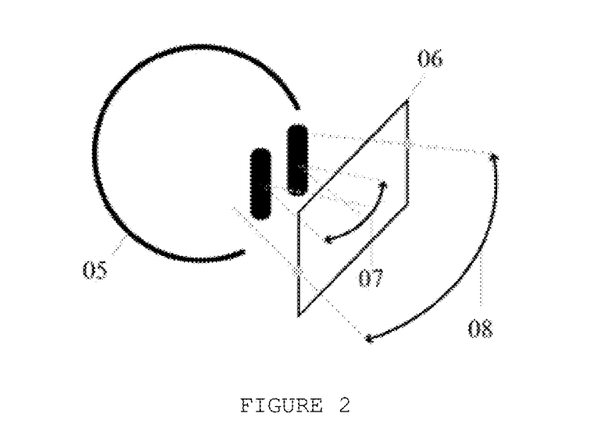
FIG. 2 discloses how display distance limits screen space on virtual reality devices.

Regarding current smartphones having Virtual Reality (VR) enabled, even the highest available PPI can't provide enough pixels for virtual experiences to have as much quality as a standard mobile application can have. It is due to the inherent nature of VR devices, which are positioned tightly close to the human eye, to a point where the eye becomes limited not by the display space, but by the field of view (FOV) itself. FIG. 2 illustrates this by showing that a common Virtual Environment screen (06) with about 100 degrees of FOV can provide almost double the FOV (08) than the human eye (07) can, which is approximately 55 degrees.

Figure 3:
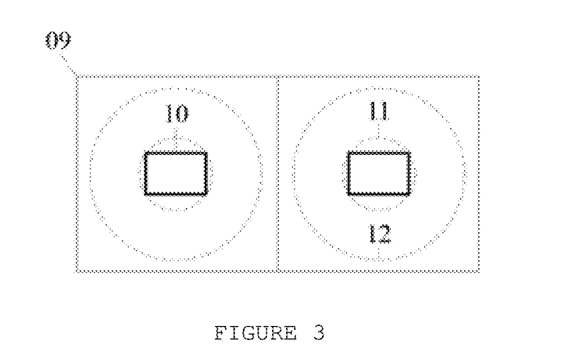
FIG. 3 discloses proportions of viewport contents in a smartphone with virtual reality enabled.

For this reason, a VR-enabled smartphone screen (09) needs to be divided in half first—one side for each eye—and then be split again by less than a half (10) to fit the eye's core (11) and peripheral (12) visions as illustrated by FIG. 3. In other words, VR devices will often use only a fraction of the available virtual display, wherein called viewport shows core application information. The number of pixels left after two split operations is, however, insufficient to support the mobile quality standard.

Fewer PPI and derived lower resolution adds new challenges for information design (ID) in virtual environments, adding complexity to the migration process of mobile interaction standards to virtual environments: the available canvas is smaller—thus supporting less content—and very limited to provide rich details. As mentioned above, it also brings new complications to the mainstream digital design paradigm referred as Flat Design (FD), impacting in its bold use of font sizes, white spaces and poster images.

One additional drawback of bringing solid and experimented mobile design frameworks to virtual environments, is that they can also be inefficient when approaching tasks such as text reading. It happens due to the natural incompatibility of text's intricate glyphs in lower density displays when trying to build signification through fine concatenation. While the lower quality impacts on reading tasks, the possible volumes of content are also decreased in over a half when comparing virtual environments with standard mobility, an issue which is less important for image compositions but that can still be quite complex when dealing with interface lines, boxes, paddings and iconography.

Figure 4:
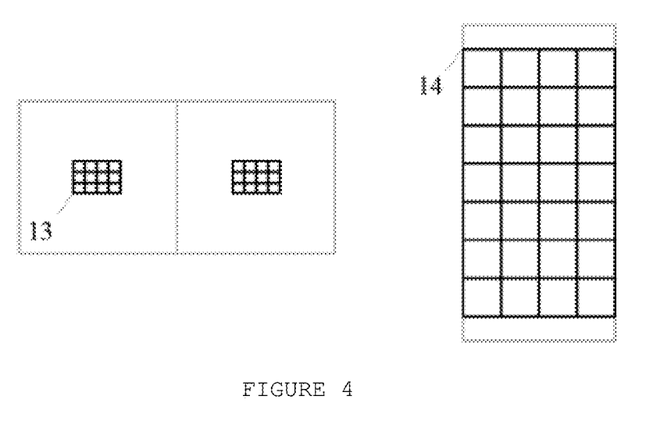
FIG. 4 compares the space of virtual viewports and common flagship screens.

Modern VR applications usually operate with this severe drop on content quantity and quality by enlarging and dividing elements across many viewports. As exemplified by FIG. 4, even with a high PPI, a standard gallery of images for virtual reality (13) shows only a quarter of the total images displayed by a common mobile application (14), with an image resolution that is reduced up to 8 times. So, either by shrinking volumes or by limiting details, the current displays for virtual environments emphasize important conflict points that need to be addressed: a rational management of viewport space, a high need for user agency on navigation, and good support methods for GUI control.

It should be noted that FOV and viewport are different concepts for user visualization areas in the present invention: while the first refers to the "user camera", the latter stands for the portion of the virtual space in which GUI elements are placed. So, while the first moves as the user rotates its head, the latter stays fixed in space until system state changes otherwise.

Figure 5:
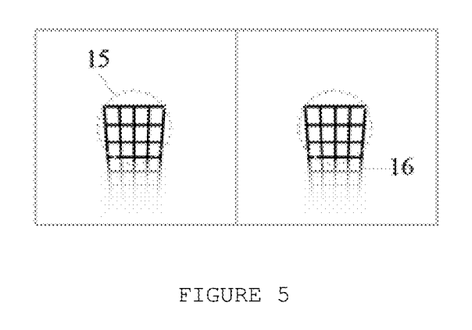
FIG. 5 illustrates undesired perspective effects on views of distant planes in virtual environments.

As many Virtual Environment devices provide a gesture-enabled touchpad (through the headset or controller), probably the most interesting areas for migration will relate to touchscreen gestures and methods such as tap, drag, flick, and swipe through the control pad. However, most panning operations generate areas on the interface in which information gets cut, or partially presented, due to a standard masking effect on viewport boundaries. As demonstrated by FIG. 5, this naturally happens on the screen boundaries of mobile devices, but if not masked to fit the eye FOV (15) in virtual environments they tend to generate an acute perspective (16) that make contents difficult to read.

Figure 6:
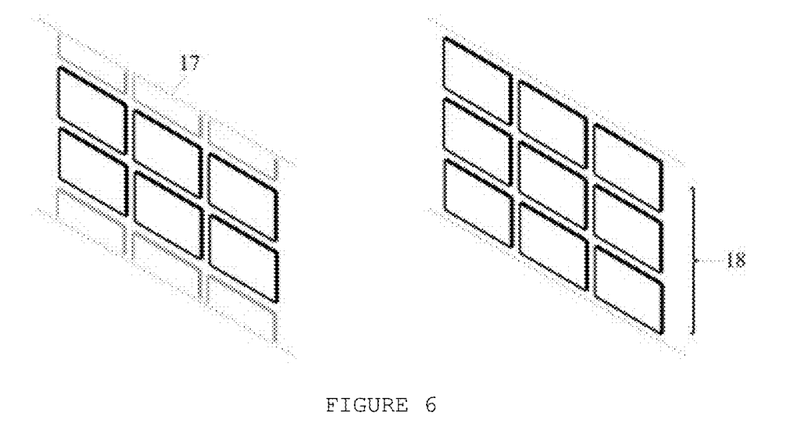
FIG. 6 discloses how poor viewport management generate bad GUI areas.

FIG. 6 demonstrates that although being a known method for mobile phones, the masking of overshot areas on a reduced Virtual Environment display (17) can compromise up to a third of its viewport contents due to its limited nature (18). In this scenario, even while being strong patterns for mobile interactive systems, the aforementioned gestures are all less efficient to control interfaces within the display restrictions of virtual environments, constantly requiring manual user interference or additional controlling methods in order to adjust and avoid those bad GUI areas. The pursue of Virtual Environment related research for lighter, wearable, and fashionable devices creates a solid obstacle to this imbalance of display.

That is precisely the context in which the method of the present invention relates to: it adds new control opportunities to standard output animations of traditional GUIs, working on subtle levels to appeal as no different to the final user, while completely solving bad areas across the viewports of VR/AR/MR applications. Because of this, both familiarity and maturity of mobility methods are immediately enabled for virtual environments, inaugurating improvement chances for all existent and forthcoming virtual applications.

Methods

In order to perform correctly, the method of the present invention presumes the availability of some system components:

Input method: user gestures expressed through a sequence of events that carry value changes over time;

Output methods: GUI animations derived from the values gathered through input that communicate changes in the system's current state;

Animation loop: mathematical functions that update current velocity/position into new velocity/position values over time;

Physics model: specific animation loop that abstracts concepts (e.g. friction, damping, tension, elasticity, weight) that change velocity/position over time in order to simulate natural movements.

The method of the present invention comprises routines to control the output animation cycles that are triggered following industry acknowledged input methods (e.g. touch gestures, button pushes). These animations often use a physics-based model that comprise a continuous loop to emulate physics behaviors and improve user performance. When the input method communicates at least two distinct values in a given time space, these values are sent to the system through an abstraction called events, which are the last manifestation of the user input process. From that moment on, the method of the present invention operates by using the input method values to modulate an output animation used by the GUI.

Figure 7:
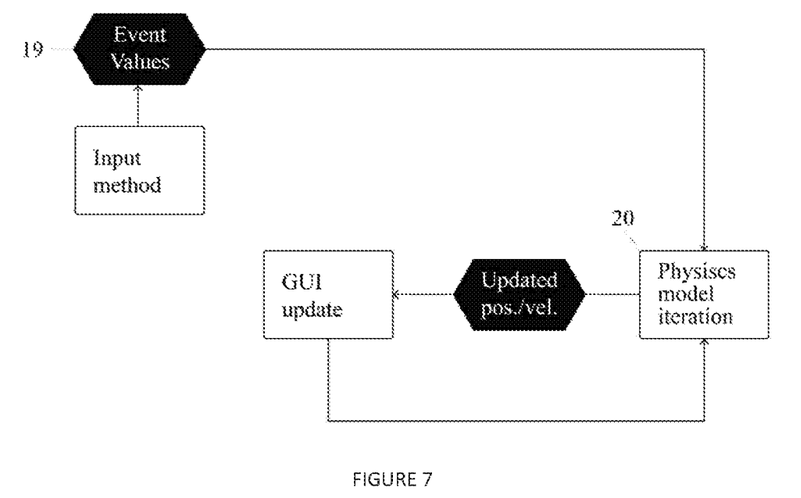
FIG. 7 exemplifies traditional animation control method cycles and resulting behaviors.

After receiving a new velocity from the user input, the traditional behavior of physics loops is to apply that velocity to the user interface by using an iteration, so the result of the current iteration is applied to the next one until it converges to a stable velocity value. An example of physics-based behavior is a GUI that decelerates current velocity of its elements in order to mimic a static friction, applying a damping function to smooth speed changes and to create a more intuitive movement. FIG. 7 demonstrates this traditional model for animating interfaces according to user inputs. Event information (19) is typically sent to a system which uses a physics model (20) to generate the counterpart animation that runs until the feedback loop stops.

In such example, a deceleration factor $D_f$ and a damping function $F_d(x)$ can compound what is considered as a traditional physics-based model of GUI movement. It means that for each loop an initial velocity $V_i$ is transformed by the following equation $V_{(i+1)}=F_d(D_f*V_i)$. The most known implementation of this kind of behavior is a spring-damper like function that gradually changes current velocity value towards the next value resulted by deceleration factor. This function smooths the variance in velocity in order to avoid abrupt changes.

Many frameworks have this type of physics-based GUI. To illustrate one possible scenario for our new control methods, we can use Unity 5.6 UI System—an open-sourced physics-based GUI implementation—which provides a ScrollRect component (a general viewport for scrolling UI items). It allows parameters configuration like sensitivity, inertia, elasticity, among others. These parameters allow the execution of movements similar to those available in smartphones nowadays, which conforms to the physics laws to a certain extent. This sample situation allows the matter of the present invention to extend the default movement for UI behavior, without the need to replace either the system's nor the built-in GUI animation loops. In that example, even when using the external Unity UI System, the velocity of items in a ScrollRect can be adjusted by the method of the present invention through an attached script on the target object.

When synchronized with the input method values, common output animation loops like Unity's will define an equivalent change on system GUI that many times will not conform to a perfect viewport organization. This common phenomenon generates poorly used areas on the interface which the method of the present invention can control. To accomplish this, the current implementation needs to receive an external function CF(x)—henceforth referred as correction function (CF)—to correct the bad positions, which once given a position x will suggest a $\Delta_x$ that fixes current position x to a nearby position x+$\Delta_x$, where the bad area situation does not occur. A correction function example can be used to snap lines of a list within viewport boundaries by a module of current position by line size S, defined by CF(x)=x-$\lfloor$x/S$\rfloor$*S. With that scenario at hand (GUI+correction function), the method of the present invention acquires the required resources to work.

Generally speaking, the method of the present invention operates by adapting an external animation loop in order to change its resulted velocity/position values before it gets called and/or called again to perform the changes over the animation time. To do so, the method of the present invention anticipates the final animation position when velocity will become zero, and then calculates a corrective force to be applied during all the output animation in order to set the final position to the one defined by the CF—this is accomplished while preserving the appearance of the physics-model animation of choice along the process.

In order to achieve this, the control method of the present invention defines two auxiliary co-dependent routines:
  Projection routine, which makes use of an inverted model created specifically to anticipate final positions and generate change factors to the used animation through current velocity and position states;
  Adaptive routine: which takes the result factor from the projection routine to modulate new velocity/position that uses the physics-model of choice to ensure the desired position after the animation loop finishes.

The control method starts from a projection routine that predicts future positions. By forecasting a future position Xf, a $\Delta_{xf}$ from our correction function CF(Xf) is obtained, i.e., it is defined which difference in position fixes the outcome of current movement. From the $\Delta_{xf}$ it is obtained a $M_f$; a modulation factor that can alter current input and get GUI system to converge to a more desirable position, thus avoiding the bad areas.

The following adaptive routine can be implemented by the calculation of gradient position, which is the difference between the desired and current positions. It means that the present adaptive routine is a correction factor $M_f$ that moves the GUI away from bad areas. So, in the beginning of the current loop (aka current GUI loop iteration), current velocity $V_i$ is modulated to become $M_f*V_i$, a change that shifts GUI movement towards the CF's adjusted position.

Figure 8:
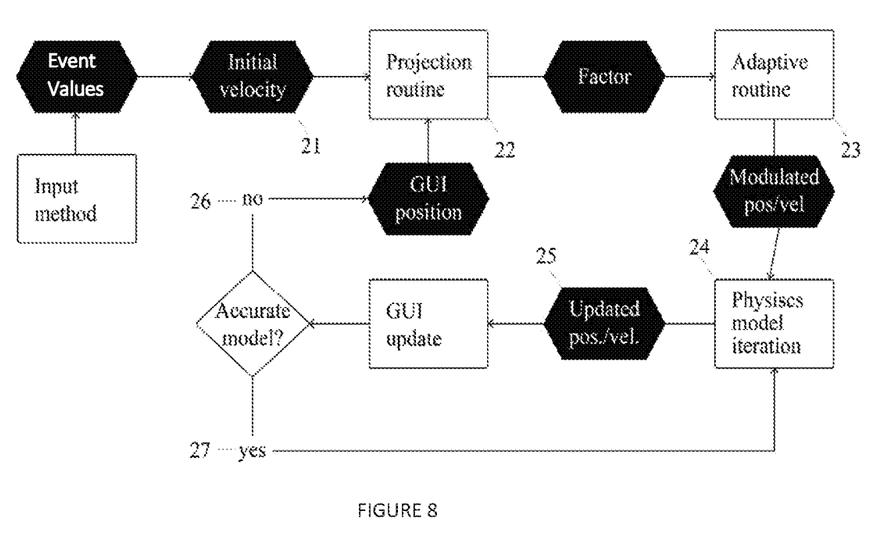
FIG. 8 exemplifies the animation control method cycles and resulting behaviors according to an embodiment of the present invention.

In FIG. 8, the cycle is triggered by an input method that is interpreted to generate an initial velocity (21). This velocity is then combined with current GUI position through the Projection routine (22) which then estimates the final projected position (when velocity will reach zero), and generates a factor that is sent to the Adaptive routine (23) to calculate new modulated position/velocity values that will finally be passed to the physics-model iteration (24) so as to continue the animation. The physics-model iteration changes the current system's state by generating a new set of position/velocity values (25), from which control method of the present invention define two distinct behaviors to continue: Progressive Forecasting (26) and Accurate Modulation (27).

Progressive Forecasting method operates with a simpler Projection routine, such as a linear simplification of the physics-model that runs on each step of the animation, getting more and more precise as the animation loop approximates to its final position. On the other hand, the Accurate Modulation runs only once for each animation iteration, using a Projection routine with a highly accurate inverted model that calculates minimal deviations for the physics-model of choice at the beginning of each animation.

In order to predict the future position, these methods provide an inverse model of GUI movement behavior. While the system's built-in implementation of the physics-based GUI loop continuously updates the initial velocity $V_i$ generated by user interaction—thus providing a physics-based velocity $V_{i+1}$ for each successive frame—the inverse model of method of the present invention forecast the sum of velocities $\Sigma_{i=1}^{K} V_i$ that would be generated by GUI system during K iterations given a velocity input $V_i$. As an example, given an external physics-based GUI model composed by friction Df and damping function $F_d(x)$, it is defined a simplified inverse model that linearizes the present GUI model by considering only the friction factor Df. In this simplified model, every iteration would generate a $V_{i+1}=Df*V_i$. Given a large enough K (considering K as the number of iterations) and since we are decelerating, we can obtain a velocity near zero, i.e., the convergence velocity. The change of position of such GUI system can be thought as the sum of a geometric progression, wherein factor Df is the progression rate and $V_0$ is the velocity generated by user interaction:

$$\text{Prediction}(V_0) = \sum_{i=1}^{K} V_i = V_0 \frac{(1 - Df^K)}{(1 - Df)}$$

Progressive Forecasting and Accurate Modulation can deliver animation controls that work silently and effectively to improve viewport management, while sustaining intense user interactivity and complete compliance with the matured mobile methods for GUI control. The improved experience is so subtle that is possible that many users will not be able to note that the system is actually reacting differently for repetitions of one same gesture or input.

Figure 9:
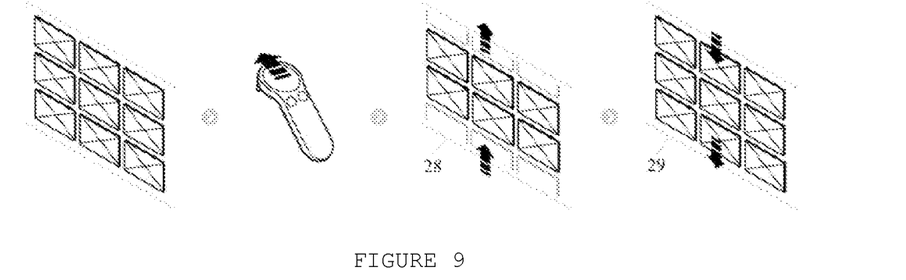
FIG. 9 discloses how a virtual reality (VR) application uses secondary methods to adjust viewport elements.
Figure 10:
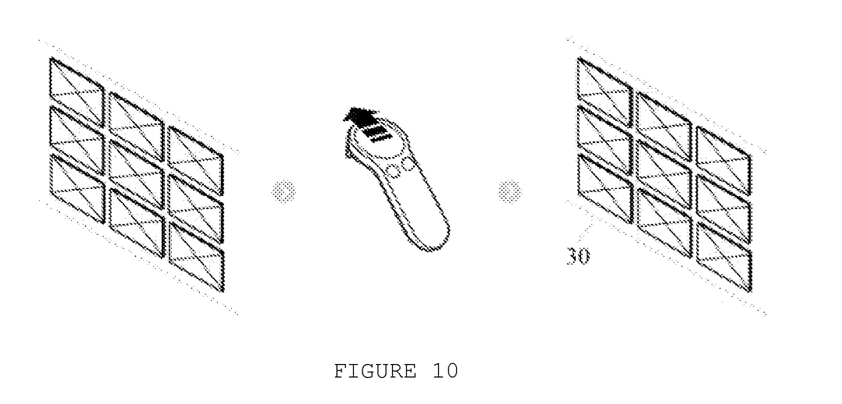
FIG. 10 exemplifies possible results of the present invention in virtual reality (VR) application.

FIG. 9 demonstrates the use case of a Gallery (VR) application, which is an example for good applicability of method of the present invention. The app traditionally adjusts the presented images to the viewport at the end of each swipe entry—after the first feedback animation finishes in response to user gesture (28), a second animation is automatically triggered (29) to make the required corrections in the viewport. Although succeeding to improve legibility when it finishes, it does so with the cost of one additional and involuntary animation which often happens in the opposite direction to user commands, thus compromising affordance, intuitiveness, reading continuity, information design and visual comfort. This second counter-intuitive animation becomes necessary due to the inefficiency of mobile standards to provide for the restricted VE displays. The method of the present invention—as illustrated in FIG. 10—succeed to control the very first animation and circumvent the need for that second corrective one, ensuring one single movement to the final destination (30) without breaking with the chosen physics model, GUI affordance, or user expectation.

Figure 11:
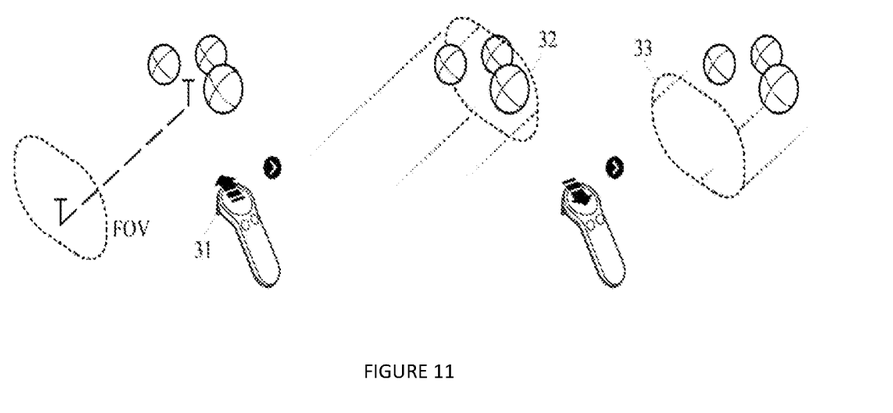
FIG. 11 discloses how Bubble Interface application requires users to manually adjust viewport elements.

Fitting contents into view is not only a matter of grid layouts such as the Gallery app. FIG. 11 shows another example—Bubble Interface application—which uses a different approach to a similar problem: by swiping, users are able to move themselves (or the camera) back and towards "image bubbles" that are floating in space. The problem happens when the swipe gesture is too strong (31) and users end up getting too near the bubbles (32), to a point where they will have to swipe back (33) to fix their position and fit the desired bubbles into VR's limited FOV. That is precisely the situation in which the method of the present invention can aid again: as illustrated on FIG. 12, they are flexible enough to give developers the required controls to avoid the excessive approximation onto the bubbles, silently modeling user's final destination to an optimal distance (34) in a single and natural output animation (35), and also eliminates the need of secondary tasks, gestures or animations in order to correct the animation results and reach a good visualization spot.

It is important to emphasize the design behind the method of the present invention: it is proposed as an extra layer of unattached animation controls that deliver complete flexibility for a variety of animations and virtual environment systems. Whenever the objective is to improve efficiency of user inputs with better management of viewport items, our methods can come of use to control animations from grids to images, layouts, camera movements, virtual elements, effects and more. When applied to frequent user inputs and gestures, the method of the present invention delivers significant improvements to the user experience as a whole.

The control method of the present invention for outputting animations are independent from the input method being used, down to the event feedback level:

1. A device may have multiple input methods (e.g. joystick/headset position, rotation, pads and buttons);
2. An input method can generate multiple event streams (e.g. swipes, drags, long-press);
3. Each event stream can trigger one or more GUI feedbacks (e.g. grid animation and camera movement);
4. Any GUI feedback animation can be individually targeted by the control methods.

Figure 12:
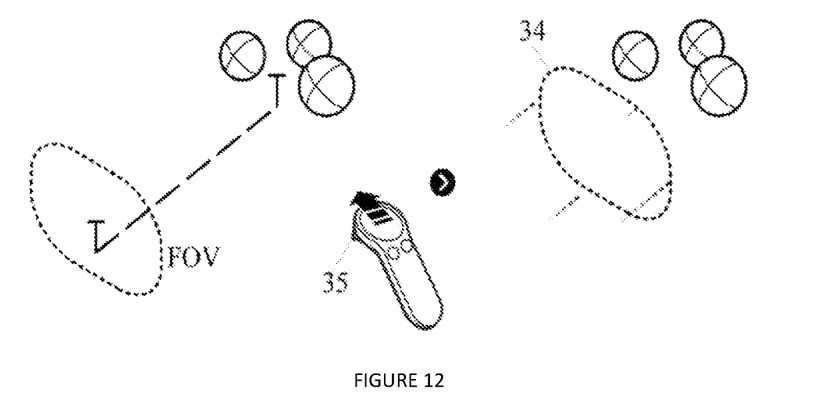
FIG. 12 exemplifies possible results of the present invention in Bubble Interface application.
Figure 13:
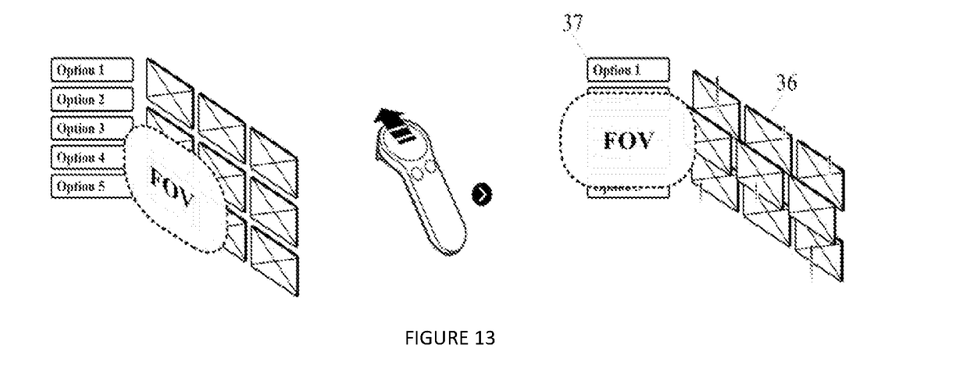
FIG. 13 discloses how a changing user focus and multiple inputs do not affect the animation control methods.
Figure 14:
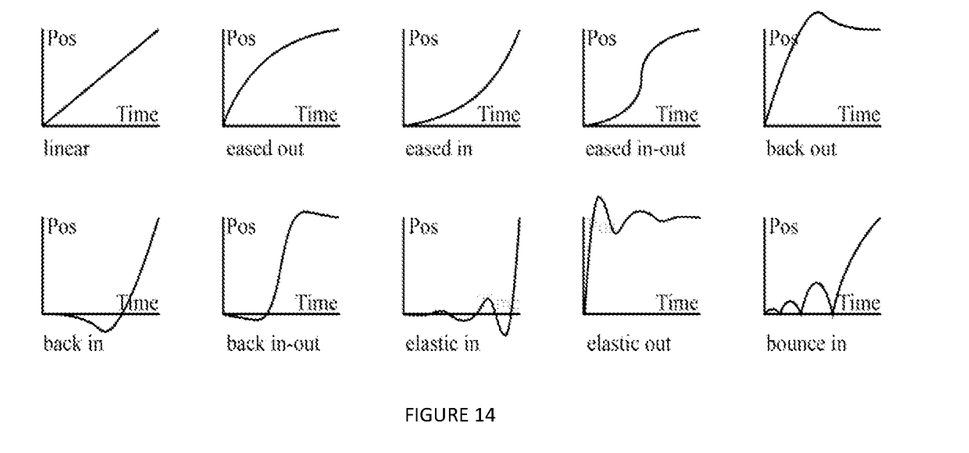
FIG. 14 exemplifies some commonly used physics-based animation using charts.

This granular flexibility enables developers to target any moving object with our methods so as to achieve controlled effects such as the grid animations of Gallery (VR) app as illustrated in FIGS. 9 and 10, or the camera movements of Bubble Interface as illustrated on FIGS. 11 and 12, or yet another implementation to improve feedback animations and overall user experience. Feedback level independence means, in other words, that simultaneous events from different input sources can be captured and controlled individually, at the same time, without however interfering with each other. As an example, FIG. 13 illustrates that, while a grid animation is being controlled by the method (36) of the present invention, a user can search for a side menu (37) and even swipe through the menu list without interrupting the prior grid behavior. The menu list can even receive another instance of our animation controls, running with complete independence from the grid. Each animation control can work according to different physics models to support standard GUI outputs (such as the commonly used easing equations illustrated on FIG. 14), as well as more advanced physics models like Spring/RK4.

With this decoupled implementation, the method of the present invention can provide multiple layers of control to avoid bad GUI areas without breaking with industry grade animations, gestures and affordances now standardized by mobile devices. They do that while preventing the need for complementary methods to further adjust viewport elements and/or correct undesired overshooting in later phases of the animation, providing a seamless and unobtrusive output response.

These control method is especially important when using gestures to command GUI behavior on virtual environments but can also be of good use on other restricted screens/situations. Additionally, due to its agnostic implementation, the present invention can also be applied to other control methods in larger screens if a developer finds a suitable scenario case of use.

Although the present disclosure has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

The invention claimed is:

1. A method for controlling animation's process running on electronic devices having a processor adapted to execute instructions stored in a memory, the method:
    interpreting an input method to generate an initial velocity by event values;
    executing a projection routine by using the initial velocity and a current graphic user interface (GUI) position to generate a factor;
    executing an adaptive routine by using the factor to calculate a new modulated position/velocity value;
    executing a physics model iteration by using the modulated position/velocity value to generate an updated position/velocity value;
    updating the graphical user interface with the updated position/velocity value; and
    executing control methods from the new set of position/velocity values, in which the control methods comprise
        a progressive forecasting method operating with a simpler projection routine; or
        an accurate modulation method running only once for each input received, and using a projection routine with a highly accurate inverted model that calculates through adaptive routine minimal deviations for a physics-model iteration of choice at the beginning of each animation.

2. The method according to claim 1 providing an inverse model of GUI movement behavior.

3. The method according to claim 1, wherein an inverse model forecasts the sum of velocities $\Sigma_{i=1}^{k} V_i$ that would be generated by a GUI system during K iterations given a velocity input $V_i$.

4. The method according to claim 3, wherein a change of position of the GUI system can be a sum of a geometric progression, wherein factor $D_f$ is the progression rate and $V_0$ is the velocity generated by user interaction:

$$\text{Prediction}(V_0) = \sum_{i=1}^{K} V_i = V_0 \frac{(1-Df^K)}{(1-Df)}.$$

5. The method according to claim 1, wherein one single movement to the final destination is ensured without breaking with a chosen physics model, GUI affordance, or user expectation.

6. The method according to claim 1, wherein considering the application's form and state, modeling final position of an interactive element to an optimal distance, and performing a single and natural output animation.

7. The method according to claim 1, wherein a device may have multiple input methods.

8. The method according to claim 1, wherein the input method is enabled to generate multiple event streams.

9. The method according to claim 1, wherein each event stream is enabled to trigger one or more GUI feedbacks.

10. The method according to claim 1, wherein any GUI feedback animation is enabled to be individually targeted by the control methods.

* * * * *

UNITED STATES PATENT AND TRADEMARK OFFICE
CERTIFICATE OF CORRECTION

| | | |
|---|---|---|
| PATENT NO. | : 11,093,117 B2 | Page 1 of 1 |
| APPLICATION NO. | : 16/376591 | |
| DATED | : August 17, 2021 | |
| INVENTOR(S) | : Taynah De Araujo Miyagawa et al. | |

It is certified that error appears in the above-identified patent and that said Letters Patent is hereby corrected as shown below:

In the Claims

Column 12, Line 63:

In Claim 3, delete "$\Sigma_{i=1}^{k}V_i$" and insert -- $\sum_{i=1}^{K} V_i$ --, therefor.

Column 13, Line 1:
In Claim 4, delete "$D_f$" and insert -- *Df* --, therefor.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*